United States Patent [19]

Vanderborgh et al.

[11] Patent Number: 4,650,727

[45] Date of Patent: Mar. 17, 1987

[54] FUEL PROCESSOR FOR FUEL CELL POWER SYSTEM

[75] Inventors: Nicholas E. Vanderborgh; Thomas E. Springer; James R. Huff, all of Los Alamos, N. Mex.

[73] Assignee: The United States of America as represented by the United States Department of Energy, Washington, D.C.

[21] Appl. No.: 823,544

[22] Filed: Jan. 28, 1986

[51] Int. Cl.$^4$ ............................................. H01M 8/06
[52] U.S. Cl. ........................................ 429/19; 429/20; 429/26; 422/193; 422/194; 48/61
[58] Field of Search .................. 429/19, 20, 26, 17; 422/193, 194, 195, 203; 48/61

[56] References Cited

U.S. PATENT DOCUMENTS

| | | | |
|---|---|---|---|
| 3,262,758 | 7/1966 | James et al. | 422/193 X |
| 3,321,333 | 5/1967 | Palmer | 429/20 |
| 3,353,922 | 11/1967 | Wunning | 422/193 X |
| 3,366,460 | 1/1968 | Christensen | 422/203 |
| 3,807,963 | 4/1974 | Smith | 422/197 |
| 4,162,290 | 7/1979 | Crawford et al. | 422/190 |
| 4,452,760 | 6/1984 | Peterson et al. | 422/148 |
| 4,473,622 | 9/1984 | Chludzinski et al. | 429/19 |
| 4,495,154 | 1/1985 | Christner | 422/203 |
| 4,504,447 | 3/1985 | Spurrier et al. | 422/204 |

OTHER PUBLICATIONS

E. Santacesaria et al., "Kinetics of Catalytic Steam Reforming of Methanol in a CSTR Reactor," Appl. Catalysis 5, 345-358 (1983).
N. Vanderborgh, "Reformer Systems," in *Electronics Division Research and Development*, compiled by M. D. J. MacRoberts and E. J. Courtney, Los Alamos National Laboratory report LA-10360-PR, pp. 69-77 (Feb. 1985).
James J. Carberry, "Heat and Mass Diffusional Intrusions in Catalytic Reactor Behavior," Catalysis Reviews 3(1), 61-91 (1969).
J. Byron McCormick et al., "The Case for the Development of Fuel-Cell-Powered Vehicles," Los Alamos Scientific Laboratory report LA-UR-80-2019 (1980).
J. R. Huff et al., "Progress in Fuel Cells for Transportation," National Fuel Cell Seminar, Norfolk, Virginia, Jun. 23-25, 1981, pp. 37-39.
S. G. Abens et al., "3 and 5 kW Methanol Powerplant Program," National Fuel Cell Seminar, Norfolk, Virginia, Jun. 23-25, 1981, pp. 120-123.
J. C. Amphlett et al., "Hydrogen Production by the Catalytic Steam Reforming of Methanol Part 1: The Thermodynamics," Can. J. Chem. Eng. 59, 720-727 (Dec. 1981).
Richard C. Alkire, Chairman, "Fuel Cell Materials Technology in Vehicular Propulsion," National Materials Advisory Board, Commission on Engineering and Technical Systems, National Research Council, NMAB-411, National Academy Press, Washington, D.C., 45-58 (1983).
J. C. Amphlett et al., "Hydrogen Production by the Catalytic Steam Reforming of Methanol Part 2: Kinetics of Methanol Decomposition Using Girdler G66B Catalyst," Can. J. Chem. Eng. 63, 605-611 (Aug. 1985).

*Primary Examiner*—Anthony Skapars
*Attorney, Agent, or Firm*—Joseph M. Hageman; Ray G. Wilson; Judson R. Hightower

[57] ABSTRACT

A catalytic organic fuel processing apparatus, which can be used in a fuel cell power system, contains within a housing a catalyst chamber, a variable speed fan, and a combustion chamber. Vaporized organic fuel is circulated by the fan past the combustion chamber with which it is in indirect heat exchange relationship. The heated vaporized organic fuel enters a catalyst bed where it is converted into a desired product such as hydrogen needed to power the fuel cell. During periods of high demand, air is injected upstream of the combustion chamber and organic fuel injection means to burn with some of the organic fuel on the outside of the combustion chamber, and thus be in direct heat exchange relation with the organic fuel going into the catalyst bed.

26 Claims, 3 Drawing Figures

FUEL PROCESSOR FOR FUEL CELL POWER SYSTEM

This invention is the result of a contract with the Department of Energy (Contract No. W-7405-ENG-36).

BACKGROUND OF THE INVENTION

This invention relates to a catalytic organic fuel processing apparatus and more particularly the apparatus as part of a fuel cell power system.

Fuel cell power systems have been used to supply power where an internal combustion engine is not practical, such as in manned space vehicles. Fuel cell power systems have also been proposed as electric vehicular power plants to replace internal combustion engines, however, various factors have limited their widespread use. Because space vehicle fuel cells used hydrogen as a fuel, and because gaseous hydrogen could not practically be stored in sufficient quantities aboard a vehicle, other fuels were examined as possible fuel cell anode feeds. However, alternative fuels had to be first converted into hydrogen which gave best fuel cell performance. This conversion step necessitated a fuel processing apparatus as part of a fuel cell based power plant. The fuel processing apparatus had to meet requirements for compactness and transient response for vehicular use. An especially rigorous requirement was that the fuel processing apparatus, after an extended shutdown period such as overnight parking, initiate the production of hydrogen for the fuel cells quite rapidly, if the apparatus was to be used in a motor vehicle. In addition, the fuel processing apparatus had to make rapid responses to changes in power demand while maintaining efficiency and low concentration of CO and other contaminates in the hydrogen produced for the fuel cells. Because the fuel processing reactions to produce hydrogen were often markedly endothermic, it was necessary to supply heat in widely varying quantities to the fuel processing apparatus to meet widely varying power demands. Often the fuel processing reactions could be catalytically enhanced, but the presence of a catalyst limited the maximum temperature at which the reactions could be run.

One of the more popular organic fuels proposed as a source of hydrogen for fuel cells was methanol. The overall reaction that converts methanol to hydrogen was:

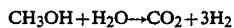

$$CH_3OH + H_2O \rightarrow CO_2 + 3H_2$$

For the reaction 40.1 kcal/mol (of methanol) of heat was needed. Approximately two thirds of this heat was used for thermal input to obtain a 200° C. reactant temperature. Industrial catalysts fabricated from partially reduced copper oxide and zinc oxide have been known to speed up the rate of reaction. However, a minimum of 15 to 20 minutes was normally necessary to bring the organic fuel processing apparatus up to temperature for the reaction to occur on a sustained basis.

U.S. Pat. No. 4,473,622 issued to Chludzinski et al. proposed a methanol-to-hydrogen cracking reactor for obtaining rapid system start up by a combination of direct and indirect heating of cracking catalyst. At system start up, the liquid methanol was burned and the hot combustion gases flowed over the outside walls of the catalytic chamber. The hot combustion gases were diverted back through the catalyst bed to heat the catalyst pellets directly. After operating temperature in the catalytic chamber for converting methanol was reached, the burner was switched from methanol to excess hydrogen from the fuel cells. Combustion gases were only in indirect heat exchange relationship with the catalyst chamber walls and were not circulated directly through the catalyst bed after operating temperature was reached. While this arrangement did reduce the start up time, it was necessary to control the temperature of the combustion gases circulating through the catalyst bed during start up to prevent damage to the catalyst by overheating. Additionally, response to transient high demand times during continuous operation was retarded by the necessity to switch fuels for combustion and to redirect the flow of combustion gases through the catalyst bed. Additionally, the flow of combustion gases through the catalyst bed risked the contamination and poisoning of the catalyst bed, especially where oxygen was present in the combustion gases. The necessity for a mechanism to control the temperature of the combustion gases circulating through the bed as well as the necessity for a valve mechanism to direct the combustion gases through the catalytic bed all added bulk to the fuel processing system. Finally, the temperature of the combustion gases circulating through the catalytic bed was hard to precisely control and damage to the catalyst from occasional bursts of overheated combustion gases was inevitable.

Overall, there is an existing need for an organic fuel processing apparatus capable of converting such fuels as methanol to hydrogen for use in fuel cells which has an acceptable start up time, efficiency, compactness, light weight, and controllable temperatures to prevent damage to any catalyst which is used to increase the conversion reaction rate. Additionally, the organic fuel processing apparatus must be able to meet transient demands for greatly increased output of organic fuel converted to the desired product such as hydrogen. Finally, a need still exists for a fuel cell power system which contains an organic fuel processing apparatus that can meet transient high power demands, has an acceptable start up time, and is compact and light weight enough for such uses as vehicle propulsion.

SUMMARY OF THE INVENTION

One object of the present invention is to provide an organic fuel processing apparatus capable of quick start up to achieve steady state operation supplying needed amounts of processed fuel.

Another object of the present invention is to provide an organic fuel processing apparatus capable of meeting transient high demands for peak amounts of processed fuel.

Yet another object of the present invention is to provide an organic fuel processing apparatus with controlled temperatures in any catalyst chamber low enough to prevent harm or other degradation to the catalyst, while at the same time providing a high enough rate of heat transfer to be both compact and yet able to provide the needed quantities of processed fuel for times of high demand.

An additional object of the present invention is to provide an organic fuel processing apparatus capable of producing a stream of hydrogen pure enough to feed a fuel cell power system.

Another object of the present invention is to provide a catalytic organic fuel processing apparatus and a fuel cell power system supplied thereby which can be controlled by a microprocessor to meet widely varying power demands.

Yet a final object of the present invention is to provide a fuel cell power system wherein little additional water need be provided to the system during operation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise a catalytic organic fuel processing apparatus comprising: a housing; a catalyst containing chamber within said housing; means to recirculate gases at varying velocities through said catalyst chamber and within said housing; means to inject varying amounts of organic fuel into the recirculating gases; a combustion chamber containing a combustion catalyst on the inside and an oxidation catalyst on the outside, said combustion chamber in indirect heat exchange relationship with said means to inject organic fuel and in both indirect and direct heat exchange relationship with said recirculating gases; means to selectively inject air into said recirculating gases upstream of said combustion chamber; means to inject varying amounts of fuel and air into said combustion chamber; and means to selectively draw off recirculating gases without at the same time drawing off substantial quantities of newly introduced organic fuel vapor.

The apparatus of this invention may also comprise a fuel cell power system comprising: at least one fuel cell; at least one fuel storage vessel; a water storage vessel; a catalytic organic fuel processing apparatus comprising: a housing; a catalyst containing chamber within said housing; means to recirculate gases at varying velocities through said catalyst chamber and within said housing; means to inject varying amounts of organic fuel and water into the recirculating gases; a combustion chamber containing a combustion catalyst on the inside and oxidation catalyst on the outside, said combustion chamber in indirect heat exchange relationship with said means to inject organic fuel and water and in both indirect and direct heat exchange relationship with said recirculating gases; means to selectively inject air into said recirculating gases upstream of said combustion chamber; means to inject varying amounts of fuel and air into said combustion chamber; means to selectively draw off recirculating gases without at the same time drawing off substantial quantities of newly introduced hydrocarbon vapor; means to transfer organic fuel from said fuel storage vessel to said organic fuel processing apparatus; means to transfer water from said water storage vessel to said organic fuel processing apparatus; means to transfer recirculating gases to said fuel cell; and means to transfer unreacted hydrogen from said fuel cell to said combustion chamber. The fuel cell power system may also further contain a water recovery unit which condenses out water in the combustion gases coming from the combustion chamber and exhaust stream from the fuel cell.

An advantage of the present invention is derived from the reduced start up time needed to bring the organic fuel processing apparatus to a temperature sufficient to convert fuel into hydrogen or other useful product streams.

Another advantage of the present invention is the ability to meet transient high demands during peak load times due to the varying velocities of the recirculating gases, the varying amounts of organic fuel that may be vaporized, the varying amounts of fuel and air that can be burned in and on the outside of the combustion chamber, and the varying amounts of recirculating gases that may be drawn from the housing.

Yet another advantage of the present invention is the ability to run the organic fuel processing apparatus at a temperature low enough to prevent damage to the catalyst, yet at the same time at a high enough heat exchange rate to meet high demands during peak load times, and yet still be a compact unit capable of being used in a motor vehicle.

Yet still another advantage of the present invention is the ability of the organic fuel processing apparatus to produce a stream of hydrogen pure enough to be used by a fuel cell.

Another advantage of the present invention is the use of a microprocessor to control the velocity of recirculating gases, the amount of fuel burned in and on the outside of the combustion chamber, the amount of organic fuel being vaporized, and the amount of recirculating gases drawn from the housing such that the organic fuel processing apparatus can meet widely varying demands for processed fuel to respond to widely varying power demands.

Finally, yet another advantage of the present invention is the condensing of water from combustion gases and fuel cell exhaust streams to eliminate the necessity for a large water storage vessel, especially when the fuel cell power system is used to drive a motor vehicle.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

Referring now to FIG. 1, a cross section of an organic fuel processing apparatus 10, a housing 12 serves as the outside wall of the apparatus 10. Within housing 12 is a catalyst chamber 14 containing the catalyst 16. Preferably the catalyst chamber is a right cylinder, open to the flow of gases at both the top and bottom. The catalyst 16 can be composed of any number of catalysts known to assist the processing of organic fuels into desired products. The amount of catalyst 16 will be determined by the maximum demand rate for the products of the processed organic fuel. In this invention, more catalyst may be required than in single pass designs. For example, a solid of partially reduced copper oxide and zinc oxide, often in the form of a porous solid, can be used. A preferred form of the partially reduced copper oxide and zinc oxide solid is an oxide-lattice-defect solid, also preferably a porous solid. The copper and zinc oxide catalyst can be obtained from United Catalyst Inc. in Louisville, Ky. Other compositions that may serve as catalysts are various metal oxides, such as copper, zinc, aluminum, chromium, and palladium oxides. Mixtures of the above compositions may also be used. Catalyst in a bead, sheet, or any other geometric form that will enhance exposure to recirculating gases may be used instead of a porous solid structure.

Figure 1:
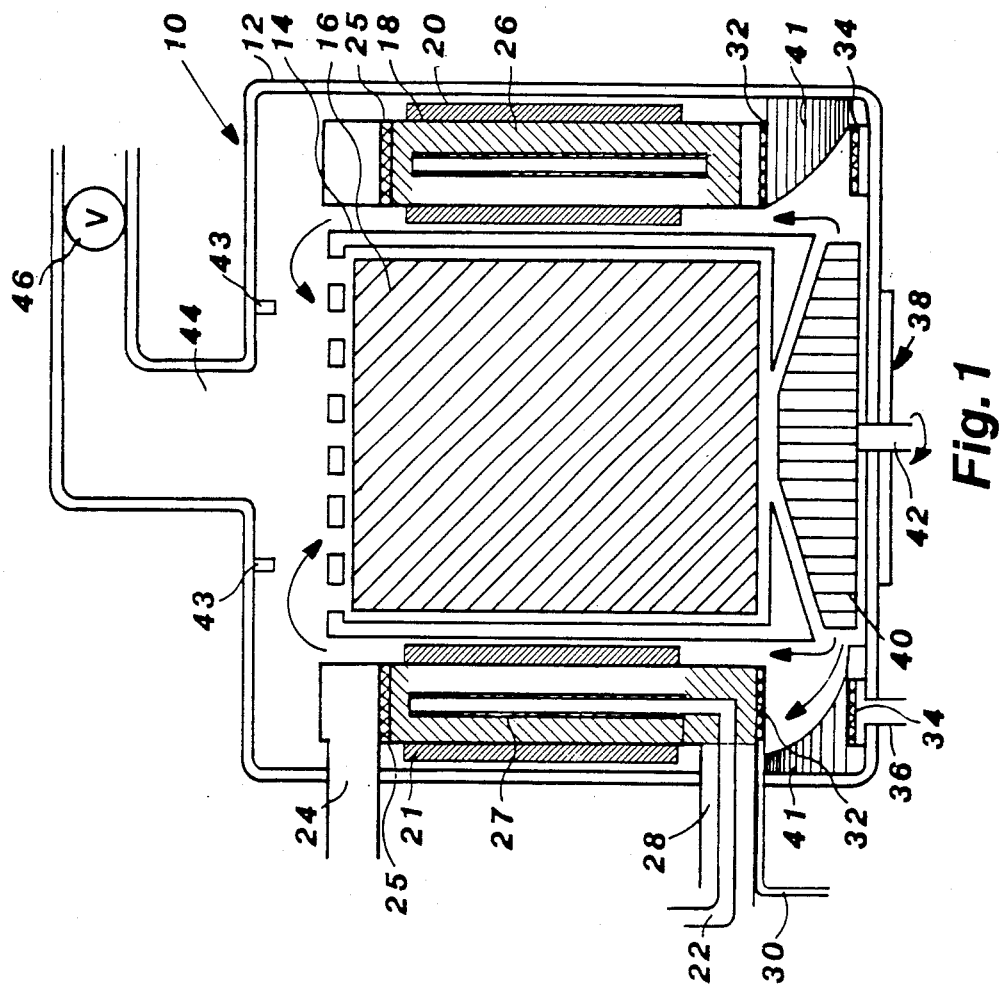
FIG. 1 is a cross-sectional elevation of the organic fuel processing apparatus.

In the annular space between the catalyst chamber 14 and housing 12 is disposed a combustion chamber 18 with numerous fins 20 that assist in heat exchange. The fins 20 are coated with an oxidation catalyst 21 such as a copper and manganese compound. Preferably the combustion chamber 18 is a tall, right angle, annular shape. A means to inject varying amounts of fuel and air into combustion chamber 18 can be composed of a variable output pump, not shown, for the fuel and a fan for the air. The pump and fan deliver the fuel and air to the combustion chamber 18 through fuel injection pipe 22 and air injection pipe 24. Within combustion chamber 18, there is provided a mechanism to distribute the injected fuel and air throughout the combustion chamber 18, as shown in FIG. 2, a detailed cross section of combustion chamber 18. Air injection pipe 24 connects to a porous circular lid 25 which admits air evenly into all parts of the interior of combustion chamber 18. Fuel injection pipe 22 connects to circular vertical manifold 27 that extends from near the bottom of combustion chamber 18 to just below porous circular lid 25. The fuel then mixes with the air in the space between circular vertical manifold 27 and the inside wall of combustion chamber 18. The inside wall is coated with a combustion catalyst 26. The combustion catalyst 26, which can be a copper and manganese compound or finely divided, porous layers of metals such as platinum or rhodium, promotes the combustion of the fuel. The heat generated by the combustion is deposited onto the wall of combustion chamber 18. Returning to FIG. 1 which shows a cross section of the organic fuel processing apparatus 10, it should be understood that the fuel and air mixture will be distributed throughout the circumference and height of the combustion chamber. For efficient heat transfer, the fuel and air mixture must ignite not only at the points where the fuel injection pipe 22 and air injection pipe 24 connect to the circular vertical manifold 27 and porous circular lid 25, respectivley, but all around the circumference and up and down the height of the inside of combustion chamber 18. Shown at the bottom of combustion chamber 18 is exhaust pipe 28 for the venting of combustion gases.

Figure 2:
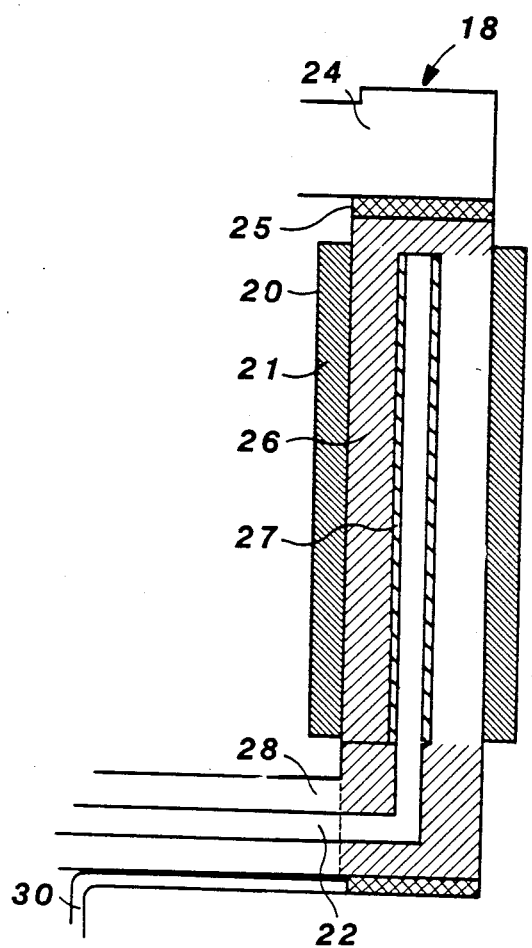
FIG. 2 is a detailed enlarged cross-sectional elevation of the combustion chamber of the organic fuel processing apparatus.

Continuing in FIG. 1, at the bottom of the organic fuel processing apparatus 10 are the means to inject varying amounts of organic fuel and preferably water and/or steam into the recirculating gases. These means can include a variable output pump, not shown, which brings the organic fuel from a storage vessel to the organic fuel processing apparatus 10 via organic fuel injection pipe 30. Water or steam is also preferably added into most kinds of organic fuels, especially methanol, before or while the organic fuel is being injected into the recirculating gases. Most preferably, a mixture of stream and methanol with a ratio of 1.3 moles of steam to 1 mole of methanol (at atmospheric pressure) is injected. The organic fuel injection pipe 30 is connected to a fuel distribution ring 32 whose walls have numerous openings to allow the organic fuel to flow out. Fuel distribution ring 32 also contains means to assure that the distribution of fuel flowing out is approximately equal at any point on the circumference. Because the fuel distribution ring 32 is attached to the bottom of combustion chamber 18, indirect heat exchange can occur and the organic fuel is heated and partially vaporized going through fuel distribution ring 32. Below the fuel distribution ring 32 in housing 12 is an air distribution ring 34. The air distribution ring 34 is fed by air injection pipe 36 which communicates with a variable speed fan, not shown. The air distribution ring 34 has numerous openings spread throughout its entire circumference and also a means to assure that the distribution of the air flowing out of the air distribution ring 34 is approximately equal at any point on the circumference.

At the bottom of housing 12 is a variable speed fan 38. This variable speed fan 38 can be made from an impeller 40 which is attached to a drive shaft 42 which must rotate in the direction consistent with stator blades' 41 orientation. FIG. 1 arbitrarily depicts a matching rotation of shaft 42 and orientation of stator blades 41. The stator blades 41 reduce azimuthal flow at the entrance of the annular region surrounding the catalyst chamber. The drive shaft 42 is connected to a variable speed electric motor, not shown. The vanes of impeller 40 are oriented such that the flow of recirculation gases is from the bottom of catalyst chamber 14 through the impeller and back up the space between the catalyst chamber 14 and housing 12 which contains the combustion chamber 18 and fuel distribution ring 32. At the top of combustion chamber 18 the recirculating gases ca either predominately go back through catalyst chamber 14 as directed by baffles 43, or, when desired, some fraction of the recirculating gases can leave by product outlet pipe 44 at the top of housing 12. Product outlet pipe 44 is controlled by valve 46 which can be opened to selectively draw off recirculating gases without at the same time drawing off substantial quantities of newly introduced organic fuel vapor. The varible output pumps and fan that feed the fuel and air to the combustion chamber 18 and organic fuel to fuel distribution ring 32 can be controlled, preferably by a microprocessor which also can control the operaton of valve 46 and the speed of the motor driving the variable speed fan 38. Typically, the fan speed is set so that the flow through the catalyst chamber 14 is 20 times or more than the flow exiting through product outlet pipe 44.

The organic fuel processing apparatus 10 operates in two modes basically. The first mode is during start up or periods of high processed product demand at peak load times. The second mode is a steady state operation following the start up mode. During the start up mode, especially if the organic fuel processing apparatus 10 has been allowed to cool to ambient temperatures, it is necessary to introduce great amounts of heat into the apparatus 10. While the combustion chamber 18 can be operated at the highest heat generation capacity, the amount of heat transferred through indirect heat exchange into the recirculating gases is not enough to provide for a practical start up time, expecially for vehicular applications. For times of high demand for heat, especially in the start up mode, fuel distribution ring 32 must be operated to inject great amounts of organic fuel into the apparatus 10. In addition, the air distribution ring 34 injects air into the recirculating gases before the recirculating gases reach the fuel distribution ring 32. The combination of air and organic fuel can then be oxidized on fins 20 coated with the oxidation catalyst 21. Air injection must be controlled to be sure that all oxygen is depleted by the oxidation process from the recirculating gases before the recirculating gases reach the catalyst 16. Any oxygen remaining in the recirculating gases may degrade the catalyst's ability to drive the organic fuel processing reactions forward. The combination of both indirect heat exchange from combustion chamber 18 and direct heat input from the oxidation in the recirculating gases allows a much higher rate of heat input. Valve 46 is mostly closed during this start up mode so that the heat generated may go into the catalyst 16, but provisions must be made to vent combustion gases downstream of valve 46 when it is intermittently opened. When catalyst 16 has reached an operating temperature of around 200° C. for the partially reduced copper oxide and zinc oxide catalyst, air is no longer injected into the recirculating gases. Also during the steady state operation, the organic fuel injection point may be shifted to an injection means at the top of catalyst chamber 16, with no organic fuel being injected any longer through fuel distribution ring 32, thus assuring that the newly injected organic fuel passes at least once through the catalyst chamber 14 and is reacted before any of it exits through product outlet pipe 44. The heat necessary to vaporize organic fuel injected through fuel distribution ring 32 can be supplied by combustion chamber 18 during steady state operation. It is important to stop the injection of air and the start up mode operation when the temperature of the catalyst 16 approaches the temperature necessary to continue steady state operation. When a catalyst such as partially reduced copper oxide and zinc oxide is used, it is necessary to keep the temperature range of the catalyst 16 within a narrow band. This is to assure that the catalyst 16 does not get overly reduced to a predominant metallic state by too high a temperature, since a predominant metallic state will not efficiently catalyze the conversion of large amounts of organic fuel into a desired product such as hydrogen. On the other hand, the temperature of the catalyst 16 cannot be allowed to fall too low or the catalyst 16 will become ineffective when its composition changes to one where there is too much oxygen present, which hinders the catalyzation of the organic fuel conversion reaction. It is thought that the presence of too much oxygen prevents such catalysts as copper and zinc oxides from absorbing the organic fuel such as methanol at the oxide defect site where the organic fuel is converted into desired products such as hydrogen.

During a period of high demand for the products of the organic fuel processing apparatus 10, depending upon the magnitude of the greater demand, the need for greater heat to convert more organic fuel can sometimes be met by more combustion in the combustion chamber 18. This would mean that the greater amounts of organic fuel coming from the fuel distribution ring 32 are sufficiently heated by the combustion chamber 18 to undergo the desired reaction in the catalyst chamber 14. The temperature of the catalyst 16 is prevented from falling below the desired range by stepping up the velocity of the recirculation gases going through the catalyst chamber 14. These greater velocities of recirculating gases are achieved by increasing the rotation rate of impellwe 40 of the variable speed fan 38. The pressure within housing 12 can be raised by injecting more organic fuel and steam into the apparatus 10. The higher pressure will enhance the transfer of heat into catalyst 16 and increase the conversion rate. However, due to the higher demand, valve 46 is open more to allow more of the desired product, such as hydrogen produced by the conversion reaction taking place within catalyst chamber 14, to exit. This loss of heat and pressure must be counteracted by increased injection of more organic fuel along with possibly more air, increased fan speed, and increased combustion in the combustion chamber 18. If the increased demand is especially great, the need for greater heat to convert even greater amounts of organic fuel can be supplied as in the start up mode by injecting air and allowing some of the organic fuel to be oxidized on the fins 20 coated with oxidation catalyst 21. The steam is not injected during the start up mode, but at all other times steam injection is necessary to facilitate the conversion reactions taking place in the catalytic chamber for such fuels as methanol.

Figure 3:
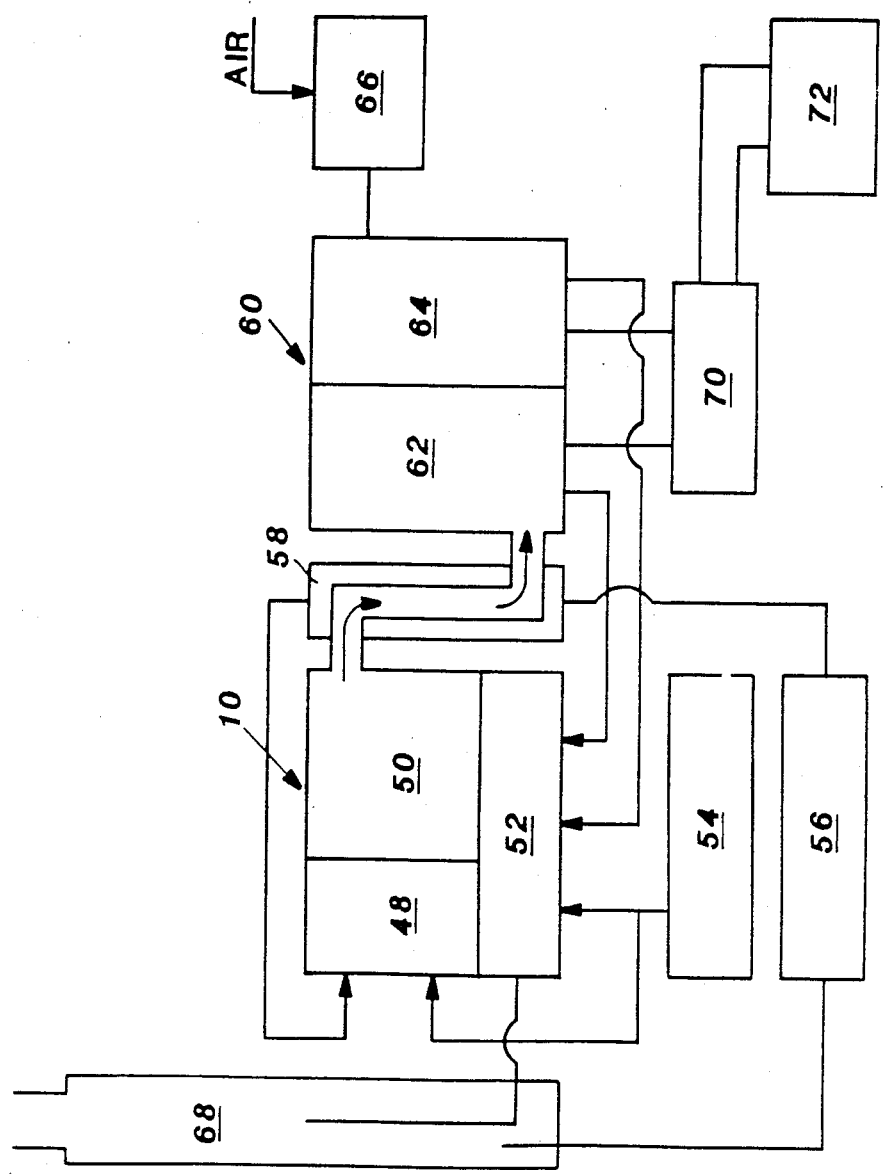
FIG. 3 is a block schematic of the fuel cell power system. cl DETAILED DESCRIPTION OF THE PREFERRED EMBODIMENTS The actual chemical reactions taking place within an organic fuel processing apparatus are usually endothermic, quite often markedly so. When a preferred fuel such as methanol is used, the heat required to raise the fuel and any accompanying water desired to drive the reaction to a greater output of hydrogen can be as much as 40.1 kcal/mol (of methanol), using a feed ratio of 1.3 $H_2O/1.0$ $CH_3OH$. Conductive heat transfer such as through the walls of an indirect heat exchanger has required wall temperatures in excess of 400° C. to sustain interior temperatures (of the catalyst bed where the reactions take place) of 200° C. This temperature difference makes transient operation inefficient and complicated to control and it increases thermal requirements and time requirements for start up procedures. To obtain fast transient response to high output demands for processed fuel, it is necessary to supply heat throughout the bulk of the catalytic reactor bed, which in turn demands that the amount of heat supplied be varied simultaneously with the input amount of fuel. Therefore, convective heat transfer wherein the organic fuel and accompanying water are preheated prior to reaction in the catalytic bed is desirable. However, if the organic fuel and water is preheated in a single step, entrance temperatures in excess of 700° C. would be required for efficient processing of fuel. Heating methanol or other organic fuels to 700° C. would cause undesirable side reactions. By recycling most of the introduced organic fuel vapors through the fuel preheater, more heat can be supplied within a narrower temperature drop. However, the amount of catalyst needed for a recirculating arrangement will be greater than for a single pass (of reactants) arrangement because of the lower mole fraction of reactants in the recirculating gases in contact with the catalyst. This arrangement allows for a rapid transient response by creating greater amounts of heat in the preheater and recycling the introduced organic fuel more quickly through the preheater to meet transient high demands for peak power. An organic fuel processing apparatus should be able to increase the output of desired product by introducing more organic fuel into the processing apparatus while deriving greater amounts of heat from the mechanism used to vaporize and preheat the organic fuel. Thus to meet the transient high demand, not only is more organic fuel introduced into the apparatus to produce greater amounts of desired product, but more heat must be generated in the preheater to provide more heat to the recirculating gases undergoing reaction. Once both of these increased amounts of heat and fuel are provided to the organic fuel processing apparatus, after a minimal time lag, more desired product can be removed from the apparatus.

Referring now to FIG. 3, a fuel cell power system, the organic fuel processing apparatus 10 is shown divided into three conceptual blocks. At the top left, a vaporizer 48 feeds a converter 50, while both are in heat exchange relationship with combustor 52. These conceptual blocks do not correspond to exact parts shown in FIG. 1, although the converter 50 is mostly localized within catalyst chamber 14. Fuel storage vessel 54 is shown feeding both combustor 52 and vaporizer 48. Of course, some means would be necessary to transfer organic fuel from the fuel storage vessel 54 to the organic fuel processing apparatus 10. Water storage vessel 56 is shown feeding water to a heat exchanger 58. The water from heat exchanger 58 then is fed to vaporizer 48. Heat exchanger 58 is also fed by the product stream emerging from converter 50. The product stream from converter 50 is cooled in heat exchanger 58 before it is fed to the fuel cell 60. Fuel cell 60 is shown divided into anode section 62 and cathode section 64, with the anode section 62 receiving the product stream from heat exchanger 58. The product stream fed to the anode section 62 is often hydrogen. In fact, for most types of fuel cells the anode section is adversely affected by any types of contaminates in the product stream coming from converter 50 through heat exchanger 58. The cathode section 64 is supplied with air by air flow control element 66. The exhaust stream from both anode section 62 and cathode section 64 are fed into combustor 52. The exhaust streams are often composed of, in part, unreacted hydrogen and indeed can, during steady state operation, provide the exclusive fuel for combustor 52. Combustor 52 sends its exhaust stream to water recovery unit 68 which condenses out water from the exhaust stream and returns it to water storage vessel 56 for recycling through the fuel processing unit 10. The electricity generated by fuel cell 60 is preferably sent to a power conditioner 70 before being sent to the electric load 72. One of the electric loads that can use power generated by the fuel cell 60 is an electric motor or motors which drives a motor vehicle. The electric load 72 can also be a household circuit and the fuel cell power system can then serve as a portable electric generator.

The organic fuel processing apparatus 10, when operating in a fuel cell power system as shown in FIG. 3, will also be subject to varying demands for porduct stream to power the fuel cell 60 which is in itself responding to variable electric loads 72. The method of meeting the high demand times will be the same as outlined previously. In this case, the organic fuel storage vessel 54 will supply increased amounts of the organic fuel both to the combustor 52 and vaporizer 48 to supply both more organic fuel for the reaction taking place in the catalyst 16 and also more fuel for the combustor 52 to assure sufficient heat in the catalyst 16 for the reactions to take place. During steady state operation, the organic fuel need only go to the vaporizer 48 because the combustor 52 will be cell 60. The combustion of the unreacted hydrogen will provide enough heat to drive the conversion of the organic fuel in the catalyst 16 forward to supply enough product stream to the fuel cell 60. While the fuel cell 60 has been referred to as a single fuel cell, of course, the fuel cell unit may be broken down into many anode sections 62 and cathode sections 64. The organic fuel can be one or a mixture of organic liquid or gaseous compounds. However, methanol is preferred. Preferably the same organic fuel will be used for both the fuel to burn in the combustor 52 and the fuel to be reacted in converter 50 to make the product stream, most often hydrogen, fed to the fuel cell 60. However, a different fuel can be burned in the combustor 52 and stored in a separate tank apart from the organic fuel storage vessel 54. Another possible variation would be to replace the combustor 52 with an electric resistance heater if long periods of steady state operation without transient high demand were contemplated. The electric resistance heater could be supplied electricity from the fuel cell or from a separate electrical source, especially if the separate electrical source would be available during the start up period. Overall, the advantages of the organic fuel processing apparatus 10 shown in FIG. 1 can be utilized in the fuel cell power system shown in FIG. 3 to allow considerable variation in the heat transfer rates by control of the reactant gas pressure and by control of the fan speed, both of which in turn allow response to transient high demands for processed fuel and, hence, electricity produced by the fuel cell 60.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A catalytic organic fuel processing apparatus comprising:
   A. a housing;
   B. a catalyst containing chamber within said housing;
   C. means to recirculate gases at varying velocities through said catalyst chamber and within said housing;
   D. means to inject varying amounts of organic fuel into the recirculating gases;
   E. a combustion chamber containing a combustion catalyst on the inside and an oxidation catalyst on the outside, said combustion chamber in indirect heat exchange relationship with said means to inject organic fuel and in both indirect and direct heat exchange relationship with said recirculating gases;
   F. means to selectively inject air into said recirculating gases upstream of said combustion chamber;
   G. means to inject varying amounts of fuel and air into said combustion chamber; and
   H. means to selectively draw off recirculating gases without at the same time drawing off substantial quantities of newly introduced organic fuel vapor.

2. The organic fuel processing apparatus of claim 1 wherein said catalyst comprises a partially reduced copper oxide and zinc oxide solid.

3. The organic fuel processing apparatus of claim 2 wherein said copper and zinc oxide solid is in the form of an oxide-lattice-defect solid.

4. The organic fuel processing apparatus of claim 1 wherein said organic fuel is mixed with water before injection into said recirculating gases.

5. The organic fuel processing apparatus of claim 1 wherein said organic fuel comprises methanol.

6. The organic fuel processing apparatus of claim 1 wherein said means to recirculate gases at varying velocities comprises a variable speed fan and baffles outside of said catalyst chamber, but within said housing, to direct the flow of said recirculating gases to said catalyst chamber and into indirect heat exchange with said combustion chamber.

7. The organic fuel processing apparatus of claim 1 wherein said combustion catalyst comprises a platinum compound.

8. The organic fuel processing apparatus of claim 1 wherein said fuel injected into said combustion chamber comprises the same organic fuel as is vaporized and injected into said recirculating gases.

9. The organic fuel processing apparatus of claim 8 wherein said fuel is methanol.

10. The organic fuel processing apparatus of claim 1 wherein said organic fuel injected into said combustion chamber during start-up and high demand times comprises the same fuel as is vaporized and injected into said recirculating gases, and, during other times, injecting hydrogen from said organic fuel processing apparatus output streams into said combustion chamber.

11. The organic fuel processing apparatus of claim 1 wherein the variable operating rates of said means to recirculate gases at varying velocities, said means to inject varying amounts of fuel and air into said combustion chamber, and said means to selectively draw off recirculating gases are all controlled by a microprocessor.

12. The organic fuel processing apparatus of claim 1 wherein said recirculating gases selectively drawn off are burned in a high compression internal combustion engine.

13. A fuel cell power system comprising:
   A. at least one fuel cell;
   B. at least one fuel storage vessel;
   C. a water storage vessel;
   D. a catalytic organic fuel processing apparatus comprising:
      i. a housing;
      ii. a catalyst containing chamber within said housing;
      iii. means to recirculate gases at varying velocities through said catalyst chamber and within said housing;
      iv. means to inject varying amounts of organic fuel and water into the recirculating gases;
      v. a combustion chamber containing a combustion catalyst on the inside and an oxidation catalyst on the outside, said combustion chamber in indirect heat exchange relationship with said means to inject organic fuel and water and in both indirect and direct heat exchange relationship with said recirculating gases;
      vi. means to selectively inject air into said recirculating gases upstream of said combustion chamber;
      vii. means to inject varying amounts of fuel and air into said combustion chamber;
      viii. means to selectively draw off recirculating gases witthout at the same time drawing off substantial quantities of newly introduced hydrocarbon vapor;
   E. means to transfer organic fuel from said fuel storage vessel to said organic fuel processing apparatus;
   F. means to transfer water from said water storage vessel to said organic fuel procesisng apparatus;
   G. means to transfer recirculating gases to said fuel cell; and
   H. means to transfer unreacted hydrogen from said fuel cell to said combustion chamber.

14. The fuel cell power system of claim 13 further comprising a means to inject water into a heat exchanger which cools the recirculating gases going to said fuel cells from said organic fuel processing apparatus, said water after passing through said heat exchanger being injected into said means to vaporize organic fuel and water.

15. The fuel cell power system of claim 13 further comprising a water recovery unit which condenses out water in the combustion gases coming from said combustion chamber and exhaust stream coming from said fuel cell, and means to transfer said condensed water to said water storage vessel.

16. The fuel cell power system of claim 13 wherein said fuel cells produce electric power to drive one or more electric motors.

17. The fuel cell power system of claim 16 wherein said electric motor drives a motor vehicle.

18. The fuel cell power system of claim 13 wherein said system serves as a portable electric generator.

19. The fuel cell power system of claim 13 wherein said catalyst comprises a partially reduced copper oxide and zinc oxide solid.

20. The fuel cell power system of claim 19 wherein said copper and zinc oxide solid is in the form of an oxide-lattice-defect solid.

21. The fuel cell power system of claim 13 wherein said organic comprises methanol.

22. The fuel cell power system of claim 13 wherein said means to recirculate gases at varying velocities comprises a variable speed fan and baffles outside of said catalyst chamber, but within said housing, to direct the flow of said recirculating gases to said catalyst chamber and into indirect heat exchange with said combustion chamber.

23. The fuel cell power system of claim 13 wherein said combustion catalyst comprises a platinum compound.

24. The fuel cell power system of claim 13 wherein said fuel injected into said combustion chamber comprises the same organic fuel as is vaporized and injected into said recirulating gases.

25. The fuel cell power system of claim 24 wherein said fuel is methanol.

26. The fuel cell power system of claim 13 wherein said fuel injected into said combustion chamber during start-up and high demand times comprises the same fuel as is vaporized and injected into said recirculating gases, and, during other times, injecting unreacted hydrogen from said fuel cell into said combustion chamber.

* * * * *